United States Patent [19]

Dahlin

[11] Patent Number: 5,200,957

[45] Date of Patent: * Apr. 6, 1993

[54] MOBILE ASSISTED HANDOFF

[75] Inventor: Jan E. A. S. Dahlin, Sollentuna, Sweden

[73] Assignee: Telefonaktiebolaget L M Ericsson, Stockholm, Sweden

[ * ] Notice: The portion of the term of this patent subsequent to Aug. 20, 2008 has been disclaimed.

[21] Appl. No.: 733,376

[22] Filed: Jul. 22, 1991

Related U.S. Application Data

[60] Continuation of Ser. No. 498,751, Mar. 26, 1990, abandoned, which is a division of Ser. No. 371,126, Jun. 26, 1989, Pat. No. 5,042,082.

[51] Int. Cl.$^5$ .............................................. H04J 3/06
[52] U.S. Cl. ............................ 370/100.1; 370/94.1; 370/95.1; 370/105; 370/105.2; 370/105.3; 370/106; 370/110.1; 379/63; 455/33.1
[58] Field of Search ............... 370/94.1, 95.1, 100.1, 370/105, 105.2, 105.3, 106, 110.1; 379/63

[56] References Cited

U.S. PATENT DOCUMENTS

| | | | |
|---|---|---|---|
| 3,916,108 | 10/1975 | Schwartz | 179/15 BA |
| 4,475,010 | 11/1984 | Huensch et al. | 455/33 |
| 4,504,946 | 3/1985 | Raychaudhuri | 370/95 |
| 4,654,867 | 3/1987 | Labedz et al. | 379/59 |
| 4,688,210 | 8/1987 | Eizenhöfer et al. | 370/18 |
| 4,748,681 | 5/1988 | Schmidt | 370/95.1 |
| 4,754,453 | 6/1988 | Eizenhofer | 370/95 |
| 4,763,322 | 8/1988 | Eizenhofer | 370/95 |
| 4,765,753 | 8/1988 | Schmidt | 379/60 |
| 4,835,770 | 5/1989 | Hayano | 370/94 |
| 4,852,090 | 7/1989 | Borth | 370/104 |
| 4,876,740 | 10/1989 | Levine et al. | 455/33 |
| 4,897,835 | 1/1990 | Gaskill et al. | 370/94.1 |
| 4,910,510 | 3/1990 | Davis et al. | 370/92 |
| 4,914,649 | 4/1990 | Schwendeman et al. | 370/95.1 |
| 5,022,024 | 6/1991 | Paneth et al. | 370/95.1 |
| 5,042,082 | 8/1991 | Dahlin | 370/95.1 |

FOREIGN PATENT DOCUMENTS 0318033 11/1988 European Pat. Off. .
WO87/06083 10/1987 PCT Int'l Appl. .

OTHER PUBLICATIONS

European Search Report Application No. EP 90 85 0185.
European Search Report Application No. EP 90 85 0225.

Primary Examiner—Douglas W. Olms
Assistant Examiner—Russell Blum
Attorney, Agent, or Firm—Burns, Doane, Swecker & Mathis

[57] ABSTRACT

The invention relates to a method for communication and handoff in a cellular mobile radio system and a base station and a mobile station for communication and handoff in such a system, in which time slot identifier codes are transmitted in bursts in times slots in frames of radio channels used for time division communication channels, the time slot identifier codes being indicative of burst time slot in a frame but not of transmitter or receiver entity or radio channel, the time slot identifier codes being used for burst synchronization and determining bursts the signal strength of which to be measured for the purpose of possible handoff.

26 Claims, 5 Drawing Sheets

RCH$_a$ | ACHi

Fig. 3b

RCH$_b$ | ACHv

RCH$_f$ | CCHK

Fig. 3f

RCH$_g$ | CCHr

Fig. 6

MOBILE ASSISTED HANDOFF

This application is a continuation of application Ser. No. 07/498,751, filed Mar. 26, 1990, now abandoned, which is a divsion of application Ser. No. 371,126 filed Jun. 26, 1989, now U.S. Pat. No. 5,042,082.

FIELD OF INVENTION

This invention relates to cellular mobile radio systems having radio channels for transmitting digital or digitized information between base and mobile stations by transmitting digitally modulated radio signals in time multiplex. More precisely the invention relates to a handover method whereby the responsibility for communication with a mobile having a connection established on a radio channel is handed over from one responsible base station to another target base station. The invention also relates to a base station and mobile station comprising means for communication and performing handoff.

BACKGROUND OF THE INVENTION

In cellular mobile radio systems it is fundamental that a mobile with an established connection on a radio channel shall be able to maintain the established connection when moving from one cell served by one base station to another cell served by another base station. It is also highly desirous that a mobile with an established connection on a radio channel shall be able to maintain the established connection when moving within the same cell and the radio channel used is subject to increased interference. The process by which a mobile can be able to maintain an established connection when moving in cells in a cellular radio system is generally called handoff.

In general a radio communication is only possible when the desired information carrying radio signals have a sufficient signal strength at the receiver and are sufficiently strong in relation to noise and interfering radio signals at the receiver. The minimum strength of course depends on the particular features of the system, e.g. the kind of modulation and receiver used. In order to make sure an established connection may continue on an intended radio channel between a mobile and an intended base station a handoff process comprises some kind of measurements on radio signals at the intended base and/or mobile station.

The first cellular mobile radio systems in public use were analogue systems for speech or other analogue information. The systems comprised multiple radio channels for transmitting analogue information between base and mobile stations by transmitting analogously modulated radio signals. In general the first cellular mobile radio systems had comparably large cells. In general the signal measurements in the handoff process in such systems were performed by the base stations. One such system is the Nordic Mobile Telephone system NMT 450. Another known cellular mobile radio system of particular interest as a background to the present invention is the AMPS mobile radio system in USA.

Recently digital cellular mobile radio systems for public use have been designed. Digital cellular mobile radio systems comprise digital radio channels for transmitting digital or digitized analogue information between base and mobile stations by transmitting digitally modulated radio signals. Digital cellular mobile radio systems may offer substantial advantages over analogue cellular mobile radio systems. To achieve these advantages there are certain demands. In particular channel supervision must be frequent and the handoff process must be rapid and be allowed to be frequent in relation to old analogue systems.

One digital mobile radio system intended to be a common system for many european countries is the GSM system. In european countries already having an analogue cellular mobile system the new digital GSM system is intended to be introduced as a new system independent of any old existing analogue system. The GSM system base and mobile stations has not been designed to be compatible with old existing systems but to give optimum performances in various aspects all by itself. Accordingly there has been a comparatively great freedom of choice in technical matters when designing the GSM system. In particular this is true with the handoff method in the GSM system. In the GSM system measurements for the purpose of handoff are done both by base and mobile station.

In contrast to introducing a new independent digital cellular mobile radio system like the GSM system in an area with an existing analogue cellular system it has been proposed to introduce a digital cellular mobile radio system designed for cooperation with the existing analogue cellular mobile radio system. To obtain digital radio channels within the frequency band allotted to cellular mobile radio systems it is proposed to withdraw a number of radio channels allotted to present analogue mobile radio systems and use them in the digital cellular mobile radio system. Due to the proposed design of the digital mobile radio system three of possibly six digital radio channels may use in time division multiplex the frequency band of one previous analgoue radio channel. Accordingly replacing some analgoue channels by multiplex digital radio channels in time division may increase the total number of radio channels in the joint analogue and digital systems.

The intention is to gradually introduce the digital system and with time gradually increase the number of digital channels and decrease the number of analogue channels in the coexisting cellular systems. Analogue mobiles already in use shall be able to continue to use remaining analogue channels. New digital mobiles shall be able to use new digital channels. New dual-mode mobiles shall be able to use both remaining analogue channels and new digital channels. In such a system the handoff process for digital radio channels can not simply be selected to be identical with any handoff process for any digital system, e.g. the GSM system. The handoff process for digital channels must not interfere with the handoff process of the existing analogue system and must not require amendments of signals in the analogue system. There are special advantages if some control channels or signals from base stations may be used for various purposes in both the analogue and the digital system. The present invention aims at such a handoff method. The invention also aims at a base station and a mobile station comprising means for communication and performing such handover for digital channels.

SUMMARY OF THE INVENTION

This invention aims at a method of communication and handoff method particularly suitable for a cellular mobile radio system comprising base stations, mobile stations, radio channels for transmitting analogue information between mobile stations and base stations by transmitting analogously modulated radio signals, radio channels for transmitting digital or digitized information between mobile and base stations by transmitting digitally modulated radio signals in time division multiplex, and control channels for transmitting control information between base and mobile stations.

One object of the present invention is to enable a handoff method for the digital part of a joint digital and analogue cellular mobile radio system, the handoff method not interfering with the analogue part of the joint cellular mobile radio system.

Another object of the present invention is to enable a handoff method for a new digital cellular mobile radio system to be used in coexistance with an old analogue cellular mobile radio system, whereby the digital system may use base station control channels or signals of the analogue system without requiring amendment of control signals in the analogue system.

Yet another object of the present invention is to achieve a communication and handoff method for digital radio channels in a cellular mobile radio system where the burden of measurements of radio signal strength and quality are shared by mobile and base stations.

Still another object of the present invention is to achieve a handoff method for a cellular mobile radio system having both analogue and digital radio channels whereby dual-mode mobiles can easily change from a digital to an analogue radio channel in connection with handoff.

The invention also has the object of providing means for convenient handoff for connections on digital communication channels sharing radio channels in time division multiplex.

In brief a communication and handoff method according to the present invention normally comprises the following steps for time division multiple access communication channels:

At setup of a connection the base responsible for the communication with a particular mobile station transmits to the mobile station, information on a particular radio channel including a particular time slot identifier code to be used for the connection and a plurality of selected radio channels. After handoff the new base station responsible for the communication transmits to the particular mobile station a new plurality of selected radio channels.

The mobile station transmits the particular time slot identifier code with radio signals in each time slot of the digital communication channel of the connection during the course of the connection.

The particular mobile station measures the strength of radio signals received on the selected radio channels and the signal strength on the digital communication channel used for the connection of the mobile station.

The particular mobile station transmits regularly to the responsible base station results of measurements of signal strength at the particular mobile station.

The base station responsible for the communication with the particular mobile station measures the signal strength on the digital communication channel used for the connection of the mobile station.

The results of the measurements done at the responsible base station and the received results from the particular mobile station are processed and analyzed and compared with criteria for handoff.

A target base station assumed suitable for being responsible for the communication with the particular mobile station is determined when, according to the processing and analyzing and comparing, a handover ought to be done. The target base station is supplied with information on radio channel and time slot identifier code of the digital communication channel of the established connection of the particular mobile station and is requested to measure signal strength on the digital communication channel.

The supplied information on radio channel and time slot identifier code is used at the target base station for finding the digital communication channel of the established connection of the particular mobile station and measuring signal strength on the digital communication channel.

The target base station reports the results of the measurements of signal strength on the digital communication channel.

A decision is then made whether the handoff shall be performed in view of the report from the target base station and the target base station and the particular mobile station are informed when the handover shall be performed and what radio channel and time slot identifier code is to be used by the particular mobile station for the established connection after the handoff.

After the particular mobile station has received information that handoff shall be performed the time slot identifier code is used by the particular mobile station to find the correct time slots and the particular mobile station thereafter transmits radio signals comprising the time slot identifier code on the radio channel.

After receiving information that a handoff shall be performed and information on radio channel and time slot identifier to be used by the particular mobile station the target base station checks the appearence of radio signals comprising the time slot identifier code on the radio channel.

Finally selected target base reports to the mobile switching centre the results of the checking of the new particular code in radio signals received by the target base.

DETAILED DESCRIPTION OF EMBODIMENTS

Figure 1:
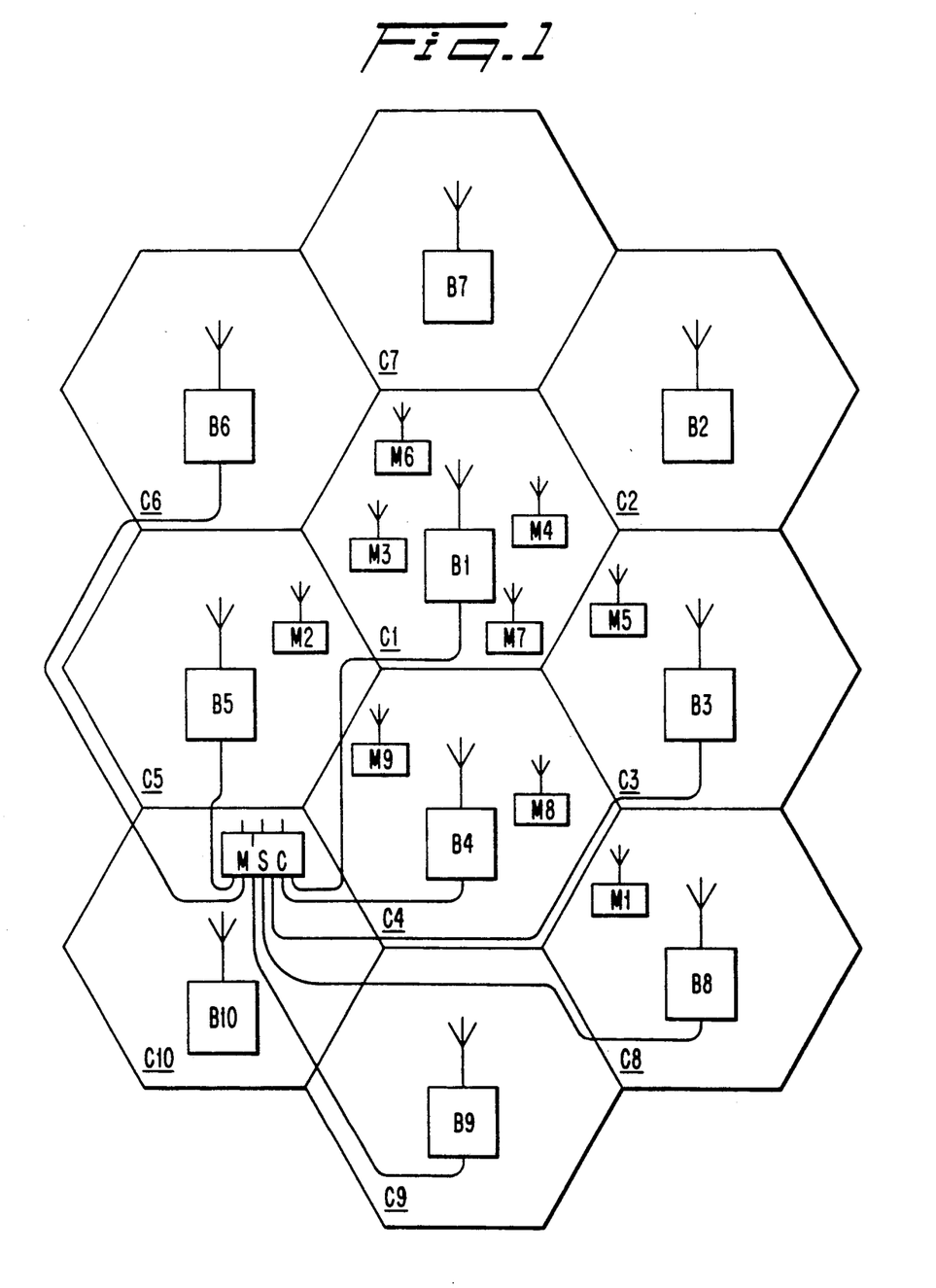
FIG. 1 illustrates part of a cellular mobile radio system with cells, a mobile switching centre, base stations and mobile stations.

FIG. 1 illustrates ten cells C1 to C10 in a cellular mobile radio system. Normally a method and means according to the invention are implemented in a cellular mobile radio system comprising many more cells than ten. However for the purpose of explaining the invention ten cells may be sufficient.

For each cell C1 to C10 there is a base station B1 to B10 with the same number as the cell. FIG. 1 illustrates base stations situated in the vicinity of cell centre and having omnidirectional antennas. The base stations of adjacent cells may however be colocated in the vicinity of cell borders and have directional antennas as is well known to those skilled in the art.

FIG. 1 also illustrates ten mobile stations M1 to M10 movable within a cell and from one cell to another cell. Normally a method and means according to the invention are implemented in a cellular mobile radio systems comprising many more mobile stations than ten. In particular the mobile stations are normally many times as many as the base station. However for the purpose of explaining the invention ten mobile stations may be sufficient.

Also illustrated in FIG. 1 is a mobile switching centre MSC. The mobile switching centre illustrated in FIG. 1 is connected to all ten illustrated base stations by cables. The mobile switching centre is connected by cables also to a fixed public switching telephone network or similar fixed network with ISDN facilities. All cables form the mobile switching centre to base stations and cables to the fixed network are not illustrated.

In addition to the mobile switching centre illustrated there may be another mobile switching centre connected by cables to other base stations than those illustrated in FIG. 1. Instead of cables other means may be used for base to mobile switching center communication, e.g. fixed radio links.

The cellular mobile radio system illustrated in FIG. 1 comprises a plurality of radio channels for communication. The system is designed both for analogue information, e.g. speech, digitized analogue information, e.g. digitized speech, and pure digital information, e.g. pure data. In this application the term connection is used for a communication channel between a mobile station and another mobile station in the same system or another system or a fixed telephone or terminal in a fixed network connected to the cellular mobile radio system. Thus a connection may be acall where two persons talk to each other but may also be a data communication channel where computers exchange data.

Figure 2:
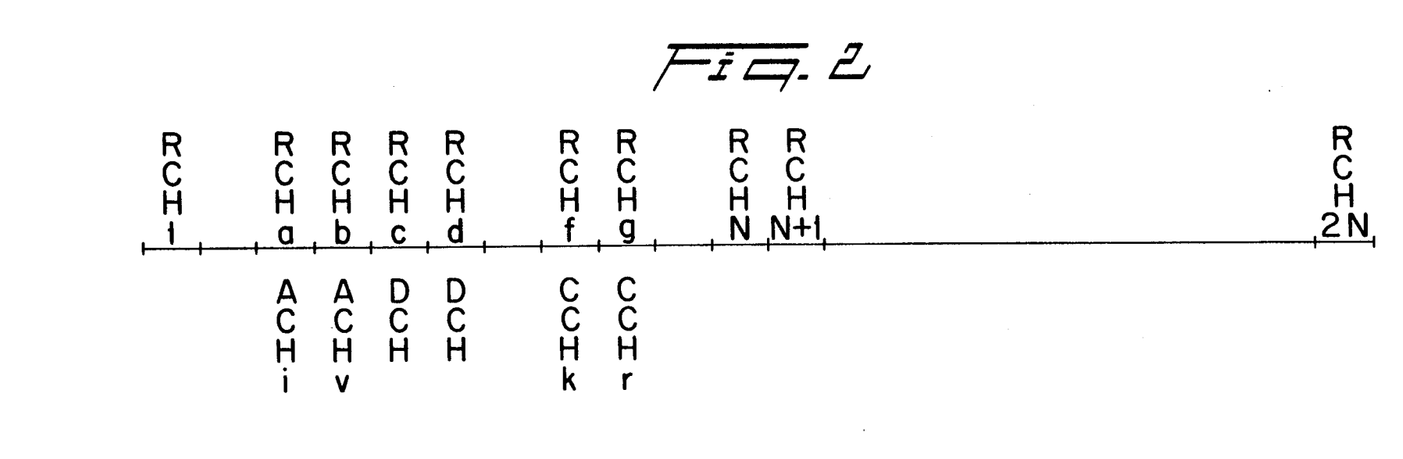
FIG. 2 illustrates a plurality of radio channels whithin a frequency band and use of some radio channels in a cellular mobile radio system according to FIG. 1.
Figure 3A:
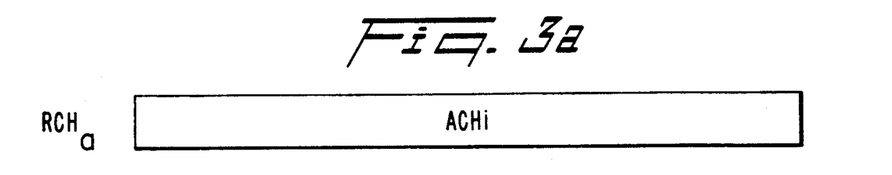
FIG. 3 illustrates use of radio channels according to FIG. 2 for control channels, analouge communication channels and time division multiplex digital communication channels in a cellular mobile radio system according to FIG. 1.
Figure 3B:
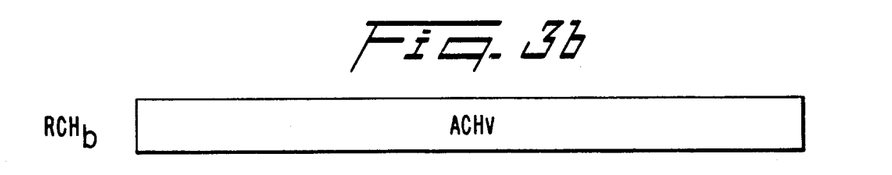
Figure 3C:
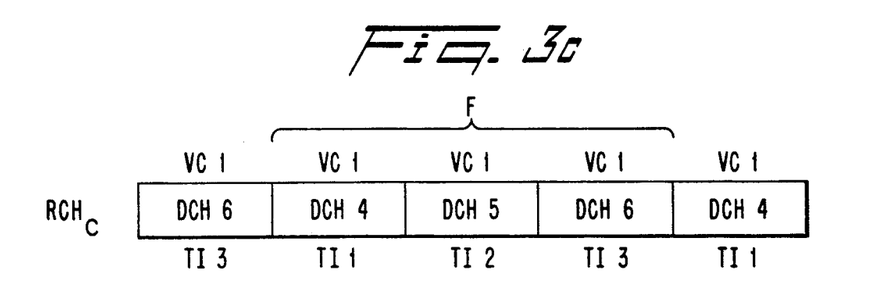
Figure 3D:
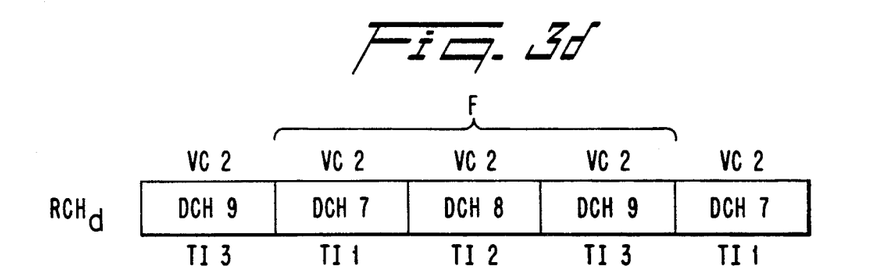
Figure 3E:
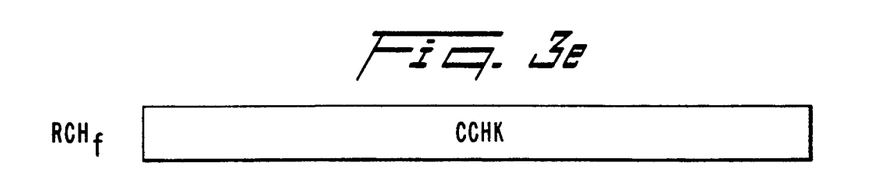
Figure 3F:
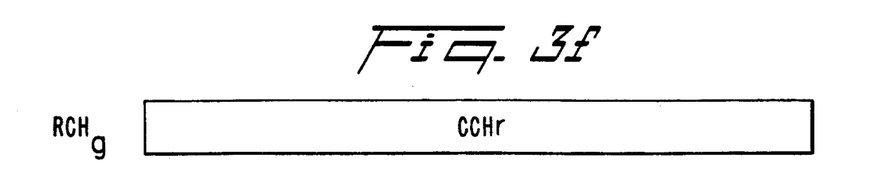

FIG. 2 illustrates somewhat simplified a plurality of radio channels RCH1 to RCH2N within frequency band. A first group of radio channels RCH1 to RCHN are used in the cellular mobile radio system for transmission of radio signals from base stations to mobile stations. A second group of radio channels RCHN+1 to RCH2N are used in the cellular mobile radio system for transmission of radio signals from mobile stations to base stations.

Some of the radio channels are used for control channels. Normally each base station has at least one control channel. Normally a control channel is not used for transfer of information on a connection but for monitoring and control of mobiles during setup of a connection, maintaining an established connection and handoff of an established connection. In FIG. 3 is illustrated how the radio channel RCHf all the time is used for a control channel CCHk while the radio channel RCHg all the time is used for a control channel CCHr.

Some of the radio channels are used for analogue communication channels. Normally analogue communication channels are used for connections where analogue information is exchanged, e.g. telephone calls where two persons talk to each other. Normally one analogue communication channel is required for each such connection. When a radio channel is used for an analog communication channel the information on the connection is transmitted with analogously modulated radio signals. In addition to the information on the connection the analogue communication channel may also be used for associated information, e.g. a supervisory audio tone. In FIG. 3 is illustrated how the radio channel RCHa all the time is used for an analogue communication channel ACHi while the radio channel RCHb all the time is used for an analogue communication channel ACHv. Normally each base station has at least one radio channel used for analogue communication channel.

Some of the radio channels are used for digital communication channels. Normally digital communication channels are used for connection where digital or digitized information is exchanged, e.g. data or digitized speech. The radio channels used for digital communication channels are divided into time slots and the time slots are grouped in frames. The time slots are allotted to digital communication channels whereby multiple digital channels share a common radio channel in time division multiplex. In FIG. 3 is illustrated a radio channel RCHc having three time slots in each frame F. A. first of the time slots is allotted to the digital communication channel DCH4, a second of the time slots is allotted to the digital communication DCH5 and the third of the time slots is allotted to the digital communication channel DCH6. Thus the radio channel RCHc is used for three digital communication channels. FIG. 3 also illustrates how the radio channel RCHd is used for three digital communication channels DCH7, DCH8 and DCH9 in a corresponding way.

In FIG. 3 the frames F of radio channels RCHc and RCHd have three time slots. Depending on the required bandwith of the various digital communication channels it is conceivable to have less slots in a frame, e.g. two slots, or to have more slots in a frame, e.g. six slots. When the digital communication channels are used for connections where digitized speech is exchanged, six time slots may result in poor speech quality when the radio channel bandwith is 30 kHz.

On a radio channel used for digital communication channels the base or mobile station transmits a time slot identifier code with the radio signals at least in every time slot used for a connection. On a particular radio channel, e.g. RCHc, the time slot identifier codes in different time slots are different. Thus the time slot identifier code TI1 is transmitted in the first time slot of radio channel RCHc allotted to digital communication channel DCH4. The time slot identifier code TI2 is transmitted in the second time slot of radio channel RCHc allotted to digital communication channel DCH5. The time slot identifier code TI3 is transmitted in the third time slot allotted to digital communication channel DCH6. Neither base nor mobile station transmits any frame synchronisation signal on the radio channel.

The same time slot identifier codes may be used on two or more radio channels, possibly all radio channels.

FIG. 3 illustrates how the time slot identifier TI1 is transmitted in the first time slot of radio channel RCHd allotted to digital communication channel DCH7. The time slot identifier code TI2 is transmitted in the second time slot of radio channel RCHd allotted to digital communication channel DCH8. The time slot identifier code TI3 is transmitted in the third time slot of radio channel RCHd allowed to digital communication channel DCH9. Thus the time slot identifier code does not alone identify the channel but identifies the time slot in a frame. It is conceivable to have one set of time slot identifiers TI1 to TI3 for channels with three slot frames F and have a different set of time slot identifiers TI4 to TI9 for six slots frames whereby the time slot identifier also may indicate the number of slots in a frame of the radio channel.

On a radio channel used for digital radio channels is also transmitted a digital voice colour code with the radio signals at least in each time slot used for a connection. On a particular radio channel the same digital voice colour code is transmitted with the radio signals in different time slots. FIG. 3 illustrates the transmission of the same digital voice colour code VC1 in all time slots of the radio channel RCHc. Normally the same digital voice colour code is used for all radio channels to and from a particular base station, e.g. the digital voice colour code VC1 is used for all radio channels to and from base station B1.

Some adjacent base stations may use the same digital voice colour code e.g. base stations B2, B6 and B7 may use the same digital voice colour code as base station B1. Other base stations use a different digital voice colour code, e.g. base stations B4, B5, B9 and B10 all use the digital colour code VC4. Still other base stations use another different digital voice colour code, e.g. base stations B3 and B8 use the digital voice colour code VC7.

Figure 4:
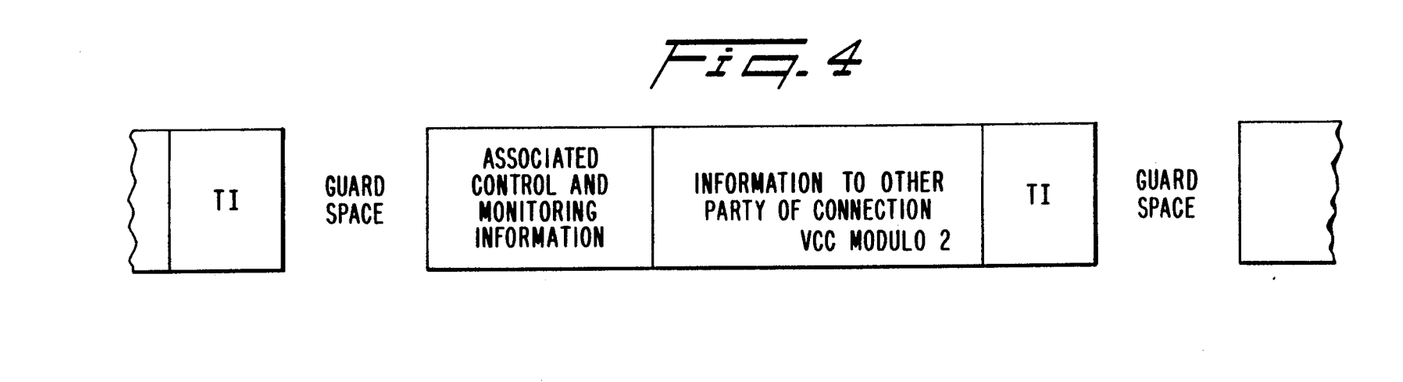
FIG. 4 illustrates bursts separated by guard spaces on a radio channel used for digital communication channels in time division multiplex according to FIG. 3 in a cellular mobile radio system according to FIG. 1.

The radio signals on a radio channel used for time division multiplex digital communication channels are transmitted in bursts. FIG. 4 illustrates a burst in a time slot separated by guard spaces from the end of the preceding burst and the beginning of a succeeding burst in adjacent time slots.

A transmitted burst comprises at least a time slot identifier, abbreviated TI, and a digital voice colour code, abbreviated VC, and normally also information to be forwarded to the other part of the connection as well as connection or channel associated information for control or monitoring purposes.

Time slot identifier code is a binary word of many bits, e.g. 26 bits. It is well known to those skilled in the art that there is a need for receiver synchronisation in time division multiple access radio communication systems. For this purpose it is well known to transmit synchronisation words or patterns in each burst and to transmit particular frame synchronisation words or patterns from a master or base station to a slave or mobile station. Preferably the time slot identifier code according to the present invention may also be used for synchronisation of receiver to transmitter.

Theoretically there exist a number of uncorrelated binary multi bit words, e.g. 26 bit words, which may be used as different synchronisation words. According to the present invention one unique time slot identifier and synchronisation word is required for each time slot in a frame on the channel. For the purpose of both time slot identification and synchronisation the time slot identifier code words are to be chosen for minimum correlation between each other and between themselves except for correlation to themselves in phase. Thus a first time slot identifier code used to identify the first time slot of a frame according to the present invention and to synchronise receiver to transmitter shall exhibit low correlation to an identical code when substantially out of phase but exhibit high correlation to an identical code when substantially in phase. A second time slot identifier code used to identify the second time slot of a frame and to synchronise receiver to transmitter shall also exhibit low correlation to an identical code when out of phase but exhibit high correlation to an identical code when substantially in phase. All other time slot identifiers used on the channel should also exhibit low correlation to an identical code when out of phase but exhibit high correlation to an identical code when in phase. Any time slot identifier code used on the channel should also exhibit low correlation to any other time slot identifier code used on the channel irrespective of phase relationship, i.e. of in phase or out of phase. Selecting time slot identifier codes in this way means that the implementation of time slot identifier codes according to the present invention does not require any dedicated bits for the time slot identifier codes.

Once the requirements on time slot identifier codes are given one skilled in the art will be able to select proper time slot identifier codes without any inventive activity. However for the convenience of those not skilled in the art the following eight 26 bit words are given as examples of possible time slot identifier codes for an eight slot frame:

| | |
|---|---|
| code for time slot 1: | (0,0,1,0,0,1,0,1,1,1,0,0,0,0,1,0,0,0,1,0,0,1,0,1,1,1) |
| code for time slot 2: | (0,0,1,0,1,1,0,1,1,1,0,1,1,1,1,0,0,0,1,0,1,1,0,1,1,1) |
| code for time slot 3: | (0,1,0,0,0,0,1,1,1,0,1,1,1,0,1,0,0,1,0,0,0,0,1,1,1,0) |
| code for time slot 4: | (0,1,0,0,0,1,1,1,1,0,1,1,0,1,0,0,0,1,0,0,0,1,1,1,1,0) |
| code for time slot 5: | (0,0,0,1,1,0,1,0,1,1,1,0,0,1,0,0,0,0,0,0,1,1,0,1,0,1,1) |
| code for time slot 6: | (0,1,0,0,1,1,1,0,1,0,1,1,0,0,0,0,0,1,0,0,1,1,1,0,1,0) |
| code for time slot 7: | (1,0,1,0,0,1,1,1,1,1,0,1,1,0,0,0,1,0,1,0,0,1,1,1,1,1) |
| code for time slot 8: | (1,1,1,0,1,1,1,1,0,0,0,1,0,0,1,0,1,1,1,0,1,1,1,1,0,0) |

When there are less than eight time slots in a frame on the radio channel less than all of the given code words may be used. However there may be advantages in using other than the given code words when there are only three time slots in a frame.

It is of course conceivable to use binary time slot identifier codes having more or less than 26 bits. Longer code words offer some advantages but has the disadvantage of occupying more of the available space in a burst.

In the advanced mobile phone service system, abbreviated AMPS, there is a supervisory audio tone, abbreviated SAT, transmitted e.g. on analog communication channels. The reason for transmitting the SAT in AMPS is that in an interference limited mobile radio communication network there should be some means for the receiving entity (e.g. base station) to identify the transmitting entity (e.g. mobile station) or at least with high likelihood exclude interchange of transmitter entity without the need for continuous transmission of transmitter identity. The object of the digital voice channel code in a cellular mobile radio system according to the present invention is at least partly the same as that of SAT in AMPS. The number of different SATs is three in AMPS. The number of different digital voice colour codes in a cellular mobile radio system according to the present invention is preferably much higher than three, mainly to support a proper introduction of discontinuous transmission. Preferably the digital voice channel code is binary word having eight bits, enabling theoretically 256 different voice colour codes.

Discontinuous transmission is a power saving function in hand held mobile stations. The basic idea behind the function is that there is no need to have the mobile transmitter on when the mobile user is not talking or transmitting any data on a connection. In a cellular system with channel reuse limited by interference this implies that the carrier of a mobile party to a connection suddently disappeares at the base station receiver and the burst of a possible interfering mobile using the same radio channel and time slot suddenly appears alone on the radio channel at the base station responsible for the connection. If the bursts of such an interfering mobile do not comprise a different digital voice colour code than the silent mobile station party to the connection the responsible base station party to the connection the responsible base station will not be able to distinguish the bursts of the interferer from those of the silent mobile actually party to the connection. Provided the signal strength of the interferer is sufficient the other party to the connection (not the silent mobile) will then overhear the conversation or data of the interferer. Accordingly the number of different digital colour codes should be high enough to guarantee that cells where the same radio channels are used and having the same colour code are at a distance from each other sufficient not to cause co-channel interference. In case discontinuous transmission is used the disturbing signal should not significantly exceed the level of noise. For this purpose an eleven bit colour code seems quite sufficient in normal cases. However the longer the colour code is the more space is required in the control channel in the connection setup and handoff procedures. Considering the possible load on control channels eight bit digital voice codes seems to be a good compromise. A separate digital voice colour code requires space in a burst thus reducing the space available for speech or data on the connection. However the following implementation of voice code does not require any dedicated bits for the digital voice code in a burst on a digital commuication channel.

At the transmitting side the digital voice colour code is added bit by bit modulo two to a field under error detection but without error correction within the information part of the burst after channel coding. On the receiving side the bursts in the time slots are deinterleaved and checked. This check is done by adding bit by bit the known digital voice colour code modulo two, as is done at the transmitting side, before channel decoding and error detection. If no error is found after adding the digital voice colour code modulo two the information part of the burst was sent from the expected transmitter and not from an interferer.

Figure 5:
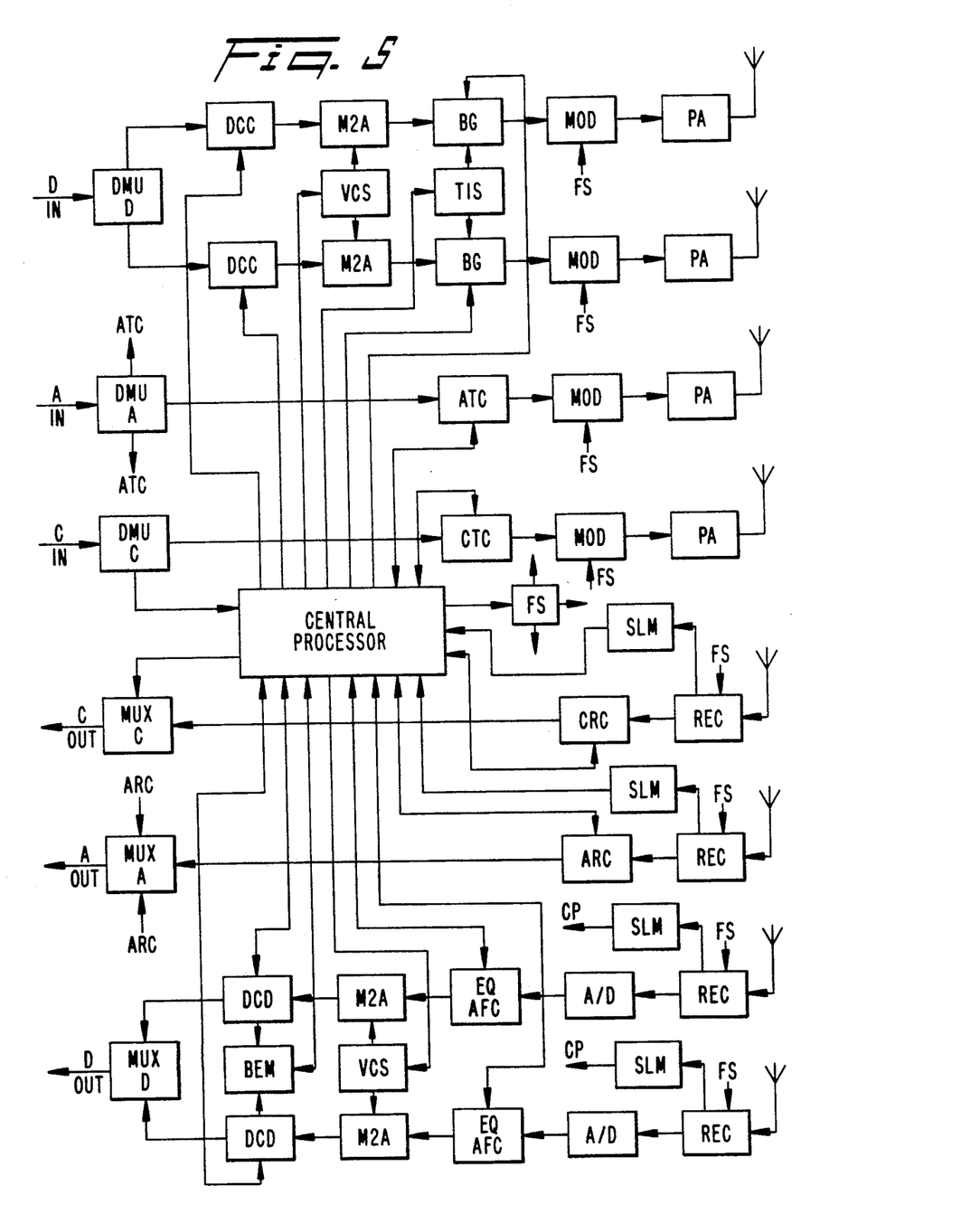
FIG. 5 illustrates a base station in a cellular mobile radio system according to FIG. 1 with radio channels used according to FIGS. 2 to 4.

FIG. 5 illustrates a base station in a cellular mobile radio system according to FIG. 1 with radio channels according to FIGS. 2 to 4. The base station is designed for transmission and reception on a plurality of radio channels used for digital communication channels, analog communication channels and control channels. In FIG. 5 not all base station equipment for all channels is illustrated. Normally a base station has equipment for more channels, in particular analogue communication channels, as well as other equipment for power supply, maintenance etc but the illustrated equipment is believed sufficient for the understanding of the present invention.

The base station is connected to a mobile switching centre by six trunks. A first incoming trunk for digital communication channels is connected to a digital trunk demultiplexor and interface DMU-D. A second incoming trunk for analog communication channels is connected to an analog trunk interface and demultiplexor DMU-A. A third incoming trunk for control channels and base station control information is connected to a trunk interface and control information demultiplexor DMU-C. A first outgoing trunk for digital communication channels is connected to a digital multiplexor and trunk interface MUX-D. A second outgoing trunk for analog communication channels is connected to an analog multiplexor and trunk interface MUX-A. A third outgoing trunk for control channels and base station information is connected to a control information multiplexor and trunk interface MUX-C.

For each of the outgoing radio channels used for digital communication channels the base station comprises digital channel coding means, DDC, connected to a digital trunk demulitplexor and interface, DMU-D, modulo two adding means, M2A, burst generation means, BG, modulator means, MOD, and power amplification means, PA, connected to an antenna. Two such outgoing radio channels share a digital voice colour code means, VCS, connected to their modulo two adding means. Two such outgoing radio channels also share a time slot identifier code means, TIS, connected to their burst generators.

For each of the outgoing radio channels used for analog communication channels the base station comprises analog transmission channel processing means, ATC, connected to an analog trunk interface and demultiplexor, DMU-A, modulator means, MOD, and power amplification means, PA, connected to an antenna.

For each of the outgoing radio channels used for control channels the base station comprises outgoing control channel processing means, CTC, connected to the trunk interface and control information demultiplexor, DMU-C, modulator means, MOD, and power amplification means, PA, connected to an antenna.

For each incoming radio channel used for digital communication channels the base station comprises radio receiver means, REC, connected to an antenna, radio signal strength or level measuring means, SLM, analog to digital conversion means, A/D, multipath equalizer and burst synchronizing and time slot recognition and automatic frequency control means, EQ-AFC, modulo two adding means, M2A and digital channel decoder means, DCD, connected to a digital multiplexor and trunk interface, MUX-D.

Two incoming radio channels used for digital communication share digital voice colour code means, VCS, connected to their modulo two adding means. Two such incoming radio channels also share digital channel bit error measuring means, BEM, connected to their digital channel decoders, DCD.

For each incoming radio channel used for analog communication channels the base station comprises radio receiver means, REC, connected to an antenna, radio signal strength or level measuring means, SLM, and incoming analog channel processing means, ARC, connected to an analog multiplexer and trunk interface, MUX-A.

For each incoming radio channel used for control channel the base station comprises radio receiver means, REC, connected to an antenna, radio signal strength or level measuring means, SLM, and incoming control channel processing means, CRC, connected to the control information multiplexor and trunk interface, MUX-C.

All modulation means and radio receiver means are connected to frequency synthesizer means, FS. The frequency synthesizer means are controlled by a central processor, CP. The CP also controls the DCCs, VCSs, BGs, EQ-AFCs, DCDs, BEM, ATC, ARC, CTC, CTC, and MUX-C. Preferably the central processor is not the only processor in the base station but other means may also comprise processors, in particular the ATC, ARC, CTC, CRC and EQ-AFCs.

The base station according to FIG. 5 is intended for communication with mobile station only having equipment designed for analog communication channels and control channels. The base station is also intended for communication with mobile stations only having equipment for digital communication channels and control channels. The base station is also intended for communication with dual mode mobile stations designed for communication on both analog and digital communicatio channels as well as control channels. Mobile stations designed only for analog communication channels may be of a kind well known to those skilled in the art and operate according to AMPS standard. Accordingly there is no need for disclosing such a mobile or its operation here.

Figure 6:
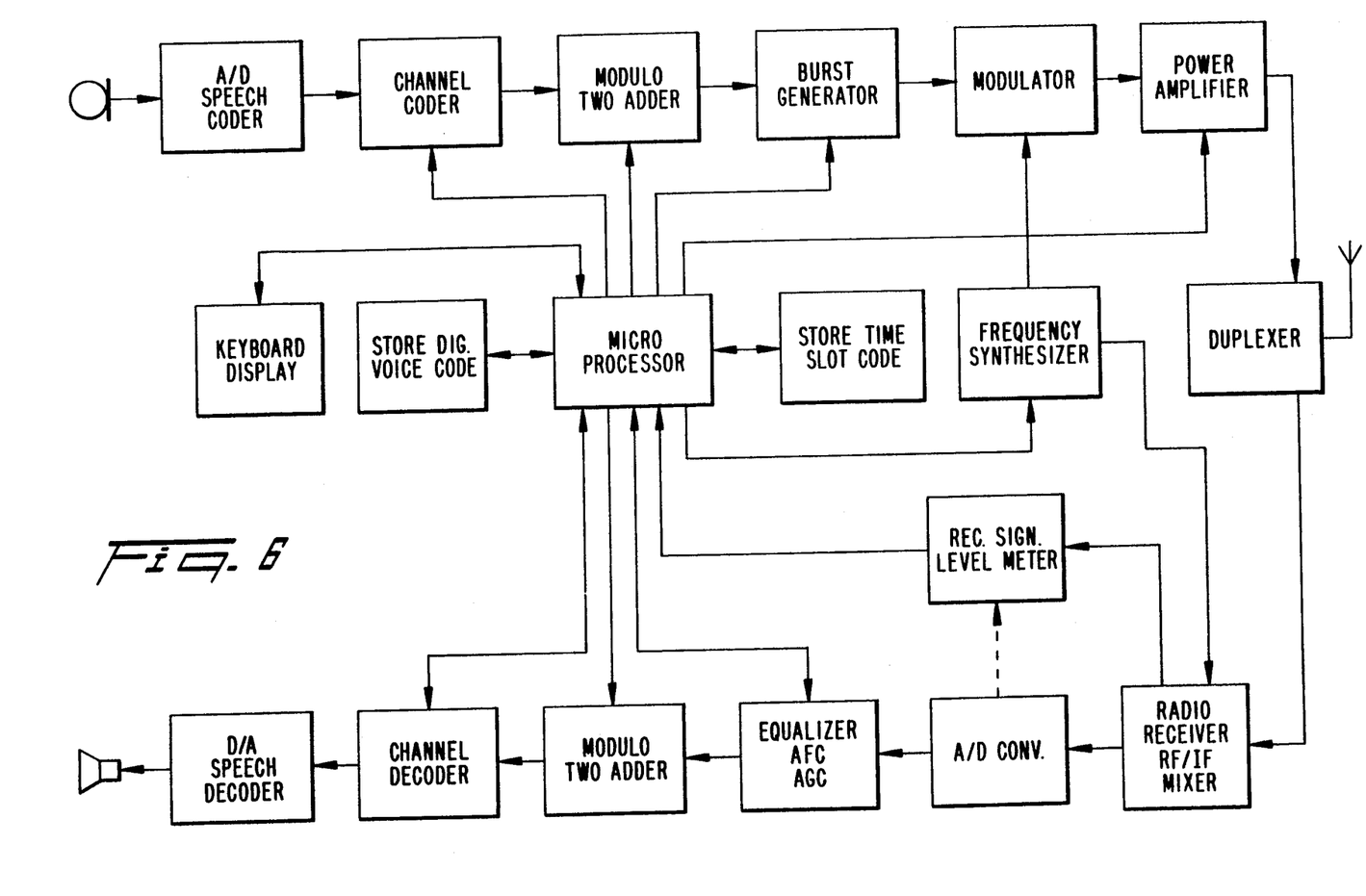
FIG. 6 illustrates a mobile station in a cellular mobile radio system according to FIG. 1 for communication with a base station according to FIG. 5 on control and digital communication channels according to FIGS. 2 to 4.

FIG. 6 illustrates a mobile station in a cellular mobile radio system according to FIG. 1 for communication with a base station according to FIG. 5 on radio channels according to FIGS. 2 to 4.

The mobile station comprises a microphone connected to analog to digital speech coding means for coding speech or sound into a binary code with a bitrate or bandwith less than 11 kHz, preferably about 7 to 8 kHz. Connected to the speech coding means is channel coding means for interleaved error protecting coding of the digital information from the speech coder. The channel coder is connected to a modulo two adder for modulo two adding of a digital voice colour code to the digital information from the channel coder. The modulo two adding means are connected to a burst generator for collecting information to be transmitted in a burst and arranging the information including time slot indentifier code into a proper burst. When the mobile is used for data transmission on a connection or during connection setup the burst generator puts data and/or control information in the burst instead of digitized speech. Such information may be supplied from a keyboard via a microprocessor and the channel coder or directly from the microprocessor. A modulator is connected to the burst generator for receiving digital information to be modulated on a radio frequency carrier from a frequency synthesizer and be amplified in a power amplifier. The modulation method used may be continuous phase modulation or other types suitable for digital information transmission. The power amplifier is connected to an antenna via a duplexer and is controlled from the microprocessor.

The mobile station also comprises a radio receiver connected to the duplexer, a radio signal strength or level measuring means and analog to digital conversion means. The radio receiver comprises RF and IF stages with filter, demodulator etc. Means for equalizing the digital communication channel and automatic frequency control and automatic gain control are connected to the radio receiver output and the input of a modulo two adder. The modulo two adder adds a digital voice colour code modulo two to the digital information from the equalizer. The modulo two adder output is connected to a channel decoder for deinterleaving and error detection and correction of digital information from the modulo two adder. Means for converting digital information to analog information or speech are connected to the channel decoder and a loudspeaker.

When the mobile station is tuned to a radio channel used by a base station for control channel some of the equipment of the mobile station is not used, in particular not channel and speech decoder. When control and monitoring information is transmitted from the base station on the control channel according to the AMPS standard the microprocessor receives and interprets signals from the analog to digital converter.

Except for the time slot identifier and the digital voice colour code and means for introducing, recognizing and removing them from the flow of information the mobile radio according to FIG. 6 may operate on time division multiplex digital communication channels in a way similar to known digital mobile radio stations, e.g. of the kind disclosed in the GSM standard or in Ericsson Review No. 3, 1987.

Accordingly there is no need here to further describe in detail the overall operation or the detailed operation of the various means. Regarding the time slot identifier code and the digital voice colour code the mobile station comprises means for storing all possible time slot identifier codes and digital voice colour codes to be used in communication with a base station. The microprocessor receives instructions from the base as to which codes to use in the particular connection and reads the codes from the stores and supplies the modulo two adders and burst generator with appropriate time slot identifier code and digital voice colour code.

When receiving radio signals from a base station synchronisation and recognition of time slot identifier is performed in the equalizer in cooperation with the microprocessor. Measurement of bit error rate on an established connection is performed in the channel decoder in cooperation with the microprocessor. Equalizers and methods of synchronisation and bit error measurement are well known to those skilled in the art. Accordingly there is not need here to further describe such methods or means for performing them.

The procedure for connection setup in a cellular mobile radio system according to FIG. 1 with a base station according to FIG. 5 and a mobile station according to FIG. 6 may be similar to the corresponding procedure in AMPS when the channel to be used is an analog communication channel. However when the channel to be used for the connection is a digital communication channel according to FIGS. 3 and 4 the base station informs the mobile station not only on radio channel but also on time slot and digital voice colour code to be used. During the setup procedure the base station then also informs the mobile station on a plurality of radio channels the signal strength on which to be measured by the mobile. Normally this plurality of radio channels are the radio channels used for control channels by adjacent bases/cells. Depending upon the movement of the mobiles as well as other circumstances a new plurality of radio channels may be selected and corresponding information be transmitted to the mobile from the responsible base station during the course of the connection. During the course of a connection for which a digital communication channel is used the mobile measures the signal strength of signals on the given plurality of radio channels. Measurements may be done during time slots not used by the digital communication channel.

The mobile station also measures signal strength on the digital communication channel used for the established connection and the bit error rate on the established connection. The mobile station transmits results of its measurements, preferably averaged, frequently to the base station, preferably twice a second.

The base station also measures signal strength on the digital communication channel used for the established connection and the bit error rate on the established connection. The base station processes and analyzes the results of its own measurements and the measurements of the mobile station and compares with criteria for handoff. When according to the results and criteria a handoff is desirous the base station informs the mobile switching centre indicating at least one target base station assumed suitable for taking over the responsibility for the communication with the mobile.

The mobile switching centre request the target base station (s) to measure signal strength on a radio channel in a time slot used by the mobile for the established connection. The mobile switching centre also informs the target base station on the digital colour code used by the mobile station.

The target base station (s) tunes (s) a receiver to the radio channel indicated by the mobile switching centre and uses the time slot identifier of the indicated time slot for burst synchronisation. The target base station checks the appearance of the digital colour code indicated by the mobile switching centre and measures the signal strength of the burst signals provided the digital colour code is correct. The target base station then transmits its results of signal strength measurement to the mobile switching centre. The target base station also informs the mobile switching centre on the result of the checking of the appearance of the digital colour code, that is whether the digital voice colour code appeared in the burst in the time slot of the radio channel.

The mobile switching centre determines whether handoff to a target base should be performed taking the results of the signal strength measurements of target bases(s) into account as well as other circumstances, e.g. traffic load.

When the mobile switching centre determines that handoff shall be performed it transmits to responsible base and target base information on new radio channel, new time slot and new voice colour code to be used by the mobile station for the connection after handoff and new radio channel to be used by target base station for the connection after handoff.

The responsible base station forwards information on the two new radio channels, new time slot and new digital colour code to the mobile. After receiving this information the mobile station tunes to the new radio channel to be used for the connection by the target base station and looks for the new time slot identifier code in received signals on the radio channel. The mobile station uses the new time slot identifier code in received signals for burst synchronisation. After synchronisation and tuning its transmitter to the new radio channel the mobile station begins transmitting bursts in the new time slot on the new radio channel. The new digital colour code is transmitted with each burst.

The target base station tunes a receiver to the new radio channel to be used for the connection by the mobile station and looks for the new time slot identifier code. The target base station uses the time slot identifier code for synchronisation. The target base station then looks for the new digital colour code in signals in the new time slot of the new channel. If the target base station identifies the new digital colour code in the bursts in the new time slot of the new radio channel this is reported to the mobile swiching centre. The mobile switching centre then interprets the handoff as successful and acts accordingly. After successful handoff the former target base station now being responsible base station informs the particular mobile station on a new plurality of radio channels the signal strength on which to be measured by the mobile.

The intelligence and decision making in a mobile cellular system according to FIG. 1 may be more or less centralized to the mobile switching centre or more or less decentralized to the base stations. In a decentralized system more or less of the functions of the mobile switching office during the handoff preparation and performance may instead be performed in the responsible and/or target base stations.

In the embodiment of the handoff method described above the responsible base station and mobile station use the same time slot identifier code and the same digital voice colour code. However, it is conceivable to use different time slot identifier at base and mobile stations for a particular connection.

In the embodiment of the handoff method described the mobile station measures signal strength on radio channels used for control channels by base station. However, it is conceivable to request mobile station to measure signal strength on radio channels used for digital communication channels by base station, in particular when there are no radio channels entirely used for control channels by base stations.

I claim:

1. In a cellular mobile radio system of the type in which digital information is communicated bidirectionally between a base station and a plurality of mobile stations over respective digital communication channels, wherein at least two digital communication channels share a common radio channel in a time division multiplex fashion, a method for synchronizing a mobile station and a base station during time slots in which digital information is transmitted bidirectionally between the mobile station and the base station, comprising the steps of:

assigning a first time slot of a radio channel to communications which are to take place from a base station to a mobile station;

assigning a second time slot of a radio channel to communications which are to take place from said mobile station to said base station;

transmitting a multi-bit time slot identifier code during said first time slot to enable said mobile station to identify said assigned first time slot in which a communication from said base station is to take place and to enable said mobile station to become phase synchronized to said base station; and transmitting a multi-bit time slot identifier code during said second time slot to enable said base station to identify said assigned second time slot in which a communication from said mobile station is to take place and to enable said base station to become phase synchronized to said mobile station.

2. The method of claim 1 wherein said time slot identifier code has the property that its degree of correlation to an identical code is relatively low when the two codes are out of phase with one another and relatively high when the two codes are in phase with one another.

3. The method of claim 2 wherein the time slot identifier code for one time slot differs from the time slot identifier code for every other time slot in the same radio channel.

4. The method of claim 1 wherein the time slot identifier code for one time slot differs from the time slot identifier code for every other time slot in the same radio channel.

5. The method of claim 1 wherein the same time slot identifier code is transmitted bidirectionally between a base station and a mobile station in communication with one another.

6. The method of claim 1 wherein said mobile radio system utilizes plural radio channels to transmit digital information and said radio channels are divided into frames having respectively different numbers of time slots, and wherein said time slot identifier code indicates the number of time slots in a frame of the radio channel over which it is transmitted.

7. The method of claim 1 wherein each of said multi-bit time slot identifier codes is at least 26 bits in length.

8. In a cellular mobile radio system of the type in which digital information is communicated bidirectionally between a base station and a plurality of mobile stations over a plurality of radio channels, and each of said plurality of radio channels is divided into at least two digital communication channels corresponding to different respective time slots in a frame of information transmitted over the radio channel, a method for synchronizing the mobile stations and the base station to one another during the transmission of information between the mobile stations and the base station, comprising the step of:

transmitting a multi-bit time slot identifier code within each time slot used for communication between said base station and said plurality of mobile stations which uniquely identifies each time slot in a frame, said time slot identifier code being transmitted over at least two of said radio channels during corresponding time slots in the respective radio channels, said time slot identifier codes having the properties that the code for each time slot in one radio channel is substantially different from the code for every other time slot in that same radio channel, the time slot identifier code being substantially different from an identical code which is out of phase with the time slot identifier code, and said time slot identifier code having its degree of correlation to said identical code being relatively low when the two codes are out of phase and relatively high when the two codes are in phase, to enable a mobile station which receives said time slot identifier code to be phase synchronized with the base station that transmits said code, and to enable a base station which receives said time slot identifier code to be phase synchronized with the mobile station that transmits said code.

9. The method of claim 8 wherein the same time slot identifier code is transmitted from a base station and a mobile station in communication with one another.

10. The method of claim 8 wherein said radio channels are divided into frames having respectively different numbers of time slots, and wherein said time slot identifier code indicates the number of time slots in a frame of the radio channel over which it is transmitted.

11. The method according to claim 8 wherein the time slot identifier code transmitted in each slot is at least 26 bits in length.

12. In a cellular mobile radio system having radio channels each including a plurality of frames divided in time slots, wherein digital information is communicated bidirectionally between a base station and a plurality of mobile stations in separate radio signal bursts in said time slots, a method for operating a base station comprising the steps of:

transmitting a first burst of radio signals in a first time slot of a frame on a radio channel from the base station to a first mobile station, said first burst including a first multi-bit time slot identifier code which identifies the time slot of the frame on the channel in which the burst is transmitted and the number of time slots in the frame, and is independent of the identity of the base station, the first mobile station and the radio channel on which the burst is transmitted;

transmitting a second burst of radio signals in a second time slot of the frame on said radio channel from the base station to a second mobile station, said second burst including a second multi-bit time slot identifier code which identifies the time slot of the frame on the channel in which the second burst is transmitted and the number of slots in the frame, and is independent of the identity of the base station, the second mobile station and the radio channel in which the second burst is transmitted, said second burst being separated from said first burst by a guard space;

receiving bursts of radio signals from a mobile station in time slots of frames on the radio channels; and synchronizing the base station to received bursts using the multi-bit time slot identifier codes of the received bursts.

13. A method according to claim 12 wherein said first and second bursts of information include control and monitoring information.

14. In a cellular mobile radio system having radio channels including a plurality of frames divided in time slots, wherein digital information is communicated bidirectionally between a base station and a plurality of mobile stations in separate radio signal bursts in said time slots, a method of operating a mobile station comprising the steps of:

storing in a mobile station a plurality of predetermined multi-bit time slot identifier codes, each of said predetermined time slot identifier codes identifying the time slot of the frame on the radio channel in which the time slot identifier code is transmitted and the number of time slots in the frame, and being independent of the mobile station identity and the radio channel in which the time slot identifier code is transmitted;

receiving at the mobile station from a base station bursts of radio signals in time slots of frames on a radio channel;

determining whether a selected one of the predetermined stored time slot identifier codes is in the received bursts;

synchronizing the mobile station to the received bursts including the selected time slot identifier code by using the selected time slot identifier code of the received bursts; and transmitting a burst of radio signals in a first time slot of a frame on a radio channel from the mobile station to the base station, said burst including the selected one of the predetermined stored multi-bit time slot identifier codes.

15. A base station for communicating with mobile stations in a cellular mobile radio system having radio channels for time division multiple access communication in time slots in frames of the radio channels, said base station comprising:

means for storing a plurality of predetermined multi-bit time slot identifier codes, the number of multi-bit time slot identifier codes equal to at least the number of time slots;

means for transmitting bursts of radio signals in time slots in frames on the radio channels;

means for incorporating in each burst transmitted from the base station one of the predetermined multi-bit time slot identifier codes identifying the time slot of the frame on the channel in which the burst is transmitted and independent of the base station identity and the radio channel in which the burst is transmitted;

means for incorporating in each burst transmitted from the base station one of a plurality of predetermined multi-bit digital voice color codes independent of said time slot identifier code in the burst and the radio channel in which the burst is transmitted;

means for receiving a burst of radio signals in a time slot of a frame on one of the radio channels;

means for synchronizing the receiving means to the received burst using the time slot identifier code of the received burst;

means for identifying the predetermined time slot identifier code received in a received burst; and means for measuring the signal strength of the received burst based on the predetermined time slot identifier code in the burst.

16. A base station for communicating with mobile stations in a cellular mobile radio system having radio channels for time division multiple access communication in time slots in frames on the radio channels, said base station comprising:

means for storing a plurality of predetermined multi-bit time slot identifier codes, the number of multi-bit time slot identifier codes equal to at least the number of time slots;

means for transmitting bursts of radio signals in time slots in frames on the radio channels;

means for incorporating in each burst transmitted from the base station one of the predetermined multi-bit time slot identifier codes identifying the time slot of the frame on the channel in which the burst is transmitted and independent of the indentity of the base station and the radio channel in which the burst is transmitted;

means for incorporating in each burst transmitted from the base station one of a plurality of predetermined multi-bit digital voice color codes independent of said time slot identifier code in the burst and the radio channel in which the burst is transmitted;

means for receiving a burst of radio signals in a time slot of a frame on one of the radio channels;

means for synchronizing the receiving means to the received burst using the time slot identifier code of the received bursts;

means for identifying the predetermined time slot identifier code received in a received burst;

means for determining whether one of said predetermined digital voice color codes is in a received burst; and means for measuring the signal strength of a burst determined to include one of said predetermined time slot identifier codes in the burst.

17. A mobile station for communicating with base stations in a cellular mobile radio system having radio channels for time division multiple access communication in time slots in frames on the radio channels, said mobile station comprising:

means for storing a plurality of predetermined multi-bit time slot identifier codes, the number of multi-bit time slot identifier codes equal to at least the number of time slots;

means for transmitting bursts of radio signals in time slots in frames on the radio channels;

means for incorporating in each burst transmitted from the mobile station one of the predetermined multi-bit time slot identifier codes identifying the time slot of the frame on the channel in which the burst is transmitted and independent of the mobile station identity and the radio channel in which the burst is transmitted;

means for incorporating in each burst transmitted from the mobile station one of a plurality of predetermined multi-bit digital voice color codes independent of said time slot identifier code in the burst and the radio channel in which the burst is transmitted;

means for receiving a burst of radio signals in a time slot of a frame on one of the radio channels;

means for synchronizing the receiving means to the received burst using the time slot identifier code of the received burst;

means for identifying the predetermined time slot identifier code received in the received burst; and means for measuring the signal strength of the received burst based on the time slot identifier code in the received burst.

18. A mobile station for communicating with base stations in a cellular mobile radio system having radio channels for time division multiple access communication in time slots in frames on the radio channels, said mobile station comprising:

means for storing a plurality of predetermined multi-bit time slot identifier codes, the number of multi-bit time slot identifier codes equal to at least the number of time slots;

means for transmitting bursts of radio signals in time slots in frames on the radio channels;

means for incorporating in each burst transmitted from the mobile station one of the predetermined multi-bit time slot identification codes identifying the time slot of the frame of the channel in which the burst is transmitted and independent of the mobile station identity and the radio channel in which the burst is transmitted;

means for incorporating in each burst transmitted from the mobile station one of a plurality of prec termined multi-bit digital voice color codes inc pendent of said time slot identifier code in the bu and the radio channel in which the burst is tra mitted;

means for receiving a burst of radio signals in a ti slots of a frame on one of the radio channels;

means for synchronizing the receiving means to t received burst using the time slot identifier code the received burst;

means for identifying the predetermined time s identifier code received in the received burst; a means for measuring the signal strength on the rac channel.

19. In a mobile radio communications system including a base station and a plurality of mobile stations wherein radio signals are transmitted bidirectionally on radio channels including a plurality of frames with a plurality of time slots, a method for communicating comprising the steps of:

transmitting on a first radio channel, in each time slot in every frame, a different time slot identifier code, said time slot identifier code identifying the time slot and the number of time slots in the frame; and transmitting on a second radio channel, in each time slot in every frame, a different time slot identifier code, said time slot identifier code identifying the time slot and the number of time slots in the frame, wherein each time slot identifier code transmitted on said second channel is the same as a time slot identifier code transmitted on said first channel, and wherein the degree of correlation of each of said time slot identifier codes to an identical code is relatively low when the codes are out of phase and relatively high when the codes are in phase.

20. In a mobile radio communications system including a base station and a plurality of mobile stations wherein radio signals are transmitted bidirectionally on radio channels including a plurality of frames with a plurality of time slots, a method for communicating comprising the steps of:

transmitting on a first radio channel, in each time slot in every frame, a different time slot identifier code, said time slot identifier code identifying the time slot and the number of time slots in the frame; and transmitting on a second radio channel, in each time slot in every frame, a different time slot identifier code, said time slot identifier code identifying the time slot and the number of time slots in the frame, wherein each time slot identifier code transmitted on said second channel is the same as a time slot identifier code transmitted on said first channel, and wherein each of said time slot identifier codes includes information for equalizing received signal transmissions.

21. In a mobile radio communications system including a base station and a plurality of mobile stations wherein radio signals are transmitted bidirectionally on radio channels including a plurality of frames with a plurality of time slots, a method for communicating comprising the steps of:

transmitting from a base station to a mobile station a time slot identifier code on a first radio channel in a time slot of a frame, said time slot identifier code identifying the time slot in the frame; and transmitting from said mobile station to said base station the same time slot identifier code on a second radio channel in a time slot of a frame, said time slot identifier code identifying the time slot in the frame.

22. The method according to claim 21 wherein said time slot identifier code identifies the number of time slots within the frame.

23. The method according to claim 22 wherein said time slot identifier code for one time slot on each of said radio channels is different from the time slot identifier code for every other time slot on the same radio channel.

24. The method according to claim 23 wherein the degree of correlation of each of said time slot identifier codes to an identical code is relatively low when the codes are out of phase and relatively high when the codes are in phase.

25. The method according to claim 23 wherein each of said time slot identifier codes includes information for equalizing received signal transmissions.

26. The method according to claim 22 wherein each time slot identifier code is at least 26 bits in length.

* * * * *